June 20, 1933.   J. J. HENNESSY   1,914,637
JOURNAL LUBRICATOR
Filed Oct. 28, 1929   2 Sheets-Sheet 1
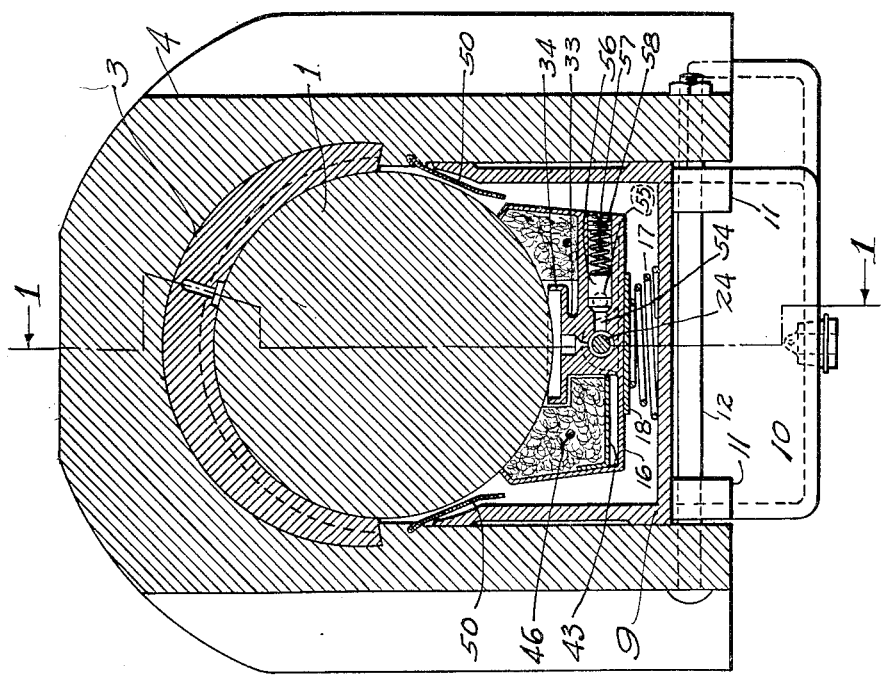
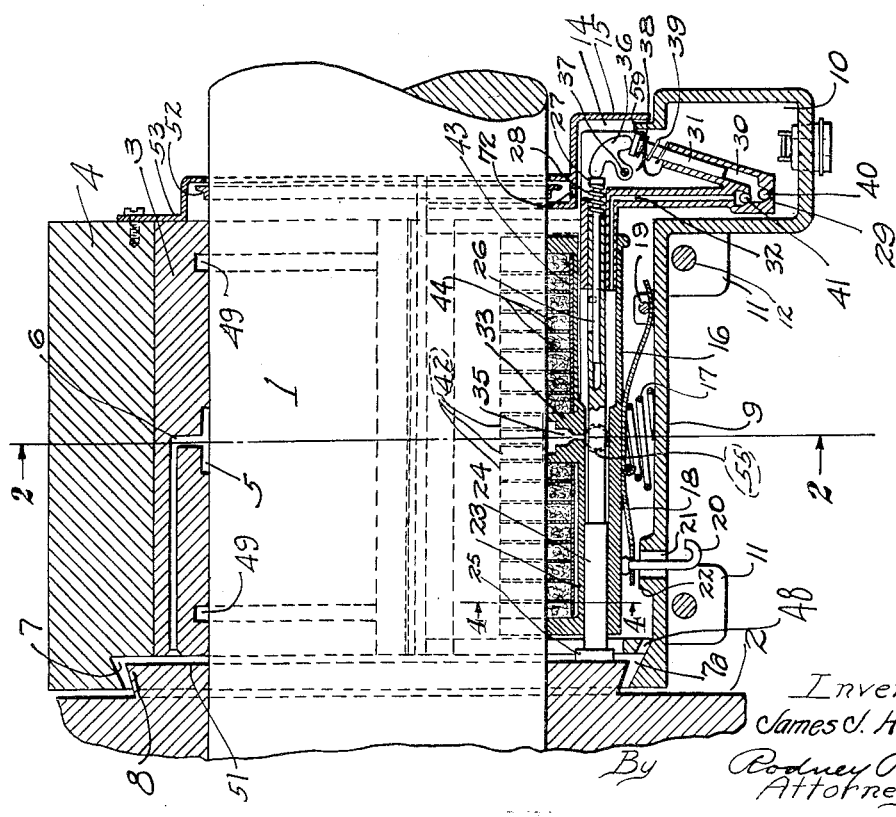
Inventor
James J. Hennessy
By Rodney Bedell
Attorney

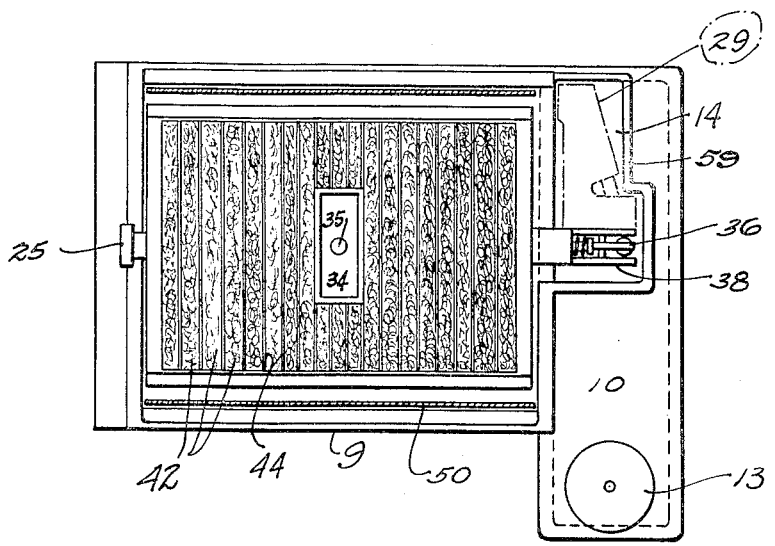
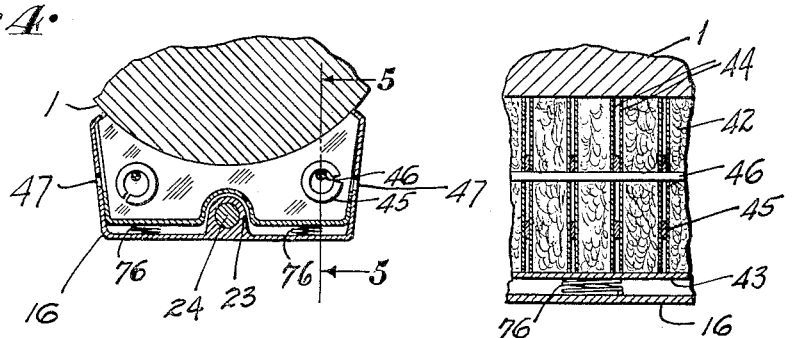
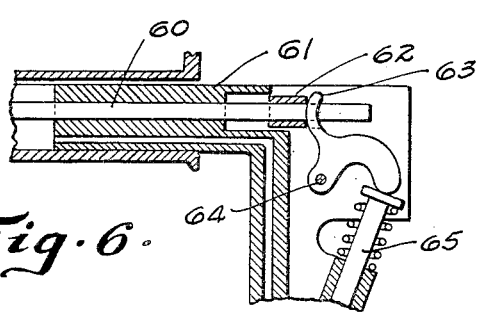
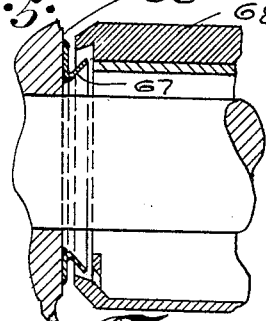

Patented June 20, 1933

1,914,637

UNITED STATES PATENT OFFICE

JAMES J. HENNESSY, OF NEW YORK, N. Y.

JOURNAL LUBRICATOR

Application filed October 28, 1929. Serial No. 403,027.

My invention relates to railroad journal lubricators of the type in which the lubricant is contained in a reservoir and is pumped to the face of the journal to be lubricated. I refer to the lubricator illustrated and described in Patent No. 1,704,742 issued to me March 12, 1929 as illustrative of this type of lubricator.

The first essential in a lubricator of this type is to get an ample quantity of the lubricant to the journal at all times and to distribute the lubricant over a substantial area of the journal surface so that lubricant will reach all points of contact between the journal and the journal bearing. If the lubricator is to be practical from a commercial standpoint, it must at the same time avoid the waste of lubricant, which is most likely to accompany the supply of an adequate quantity of lubricant to the journal surface.

The general objects of my present invention are to provide an effective pump which can be easily inspected, repaired and replaced; to provide an efficient means for distributing lubricant from the discharge end of the pump to a large surface of the journal; and to collect all surplus lubricant before it can escape from the journal and box to the road-way and return the surplus lubricant to the reservoir.

Other detailed objects of my invention will appear from the following description and by reference to the accompanying drawings, in which—

Figure 1 is a vertical longitudinal section through a locomotive driver axle, bearing and box having my novel lubricator applied thereto and is taken approximately on the line 1—1 of Figure 2.

Figure 2 is a vertical transverse section taken on the line 2—2 of Figure 1.

Figure 3 is a top view of the lubricator device.

Figure 4 is a detail vertical transverse section taken on the line 4—4 of Figure 1.

Figure 5 is a longitudinal vertical section taken on the line 5—5 of Figure 4 and drawn on an enlarged scale.

Figure 6 is a detail longitudinal vertical section illustrating a modification of my invention.

Figure 7 is a section through a wheel hub journal and box illustrating another modification of my invention.

The driver journal is indicated at 1 and mounts the driving wheel 2 in the usual manner. A brass bearing member 3 is carried by the journal 1 in the usual manner and supports the driver box 4.

The bearing 3 corresponds to the usual brass except that it is provided with a counter-bore 5 and a passage-way 6 leading therefrom to the outer edge of the bearing. Box 4 corresponds to the usual box except that its hub face is provided with an undercut groove 7. The driver wheel 2 corresponds to the usual wheel but has its hub machined, as indicated at 8, to extend into the groove 7 on the box.

The body of the lubricator includes a cellar 9 and a reservoir 10 extending downwardly from the bottom of the cellar at one end and also extending laterally from one side of the cellar. This cellar is provided with lugs 11 through which bolts 12 are passed to secure the cellar to the box in the usual manner. The hub end of the cellar is grooved at 7ª to correspond to the groove 7 in the box.

The reservoir is provided with a filling spout 13 located in the laterally extending portion and there is an opening 14 in the top wall of the reservoir extending from the center line of the lubricator to the side opposite spout 13. A cover 15 is releasably applied to this opening, being secured in place by any desired means such as illustrated in my above-mentioned Patent No. 1,704,742.

A pan-shaped sub-cellar 16 is yieldingly supported by a coil spring 17 which rests upon the bottom of the cellar. Preferably, a plate 18 is pivotally assembled with the bottom of the cellar at 19 and is provided with a pull-down pin 20 extending through an opening 21 in the bottom wall of the cellar so that it may be manually engaged from the outside of the lubricator and facilitate the removal or insertion of the sub-cellar.

An elevation 22 surrounds opening 21 so that any oil which may be fed to the bottom of the cellar will flow around the opening 21 back to the reservoir.

The side and end walls of the sub-cellar 16 extend up to and preferably engage the surface of the journal 1. The central portion of the sub-cellar includes an elongated hollow strip 23 which receives the pump operating rod 24. The left hand or outer portion of this rod slidingly fits the interior of member 23 and terminates in a button 25 adapted to engage the inner face of the wheel hub. The remainder of the rod 24 is reduced in diameter to provide a lubricant passage between the same and the interior of the opening in member 23. The right hand portion of rod 24 is hollow and receives a pin 26 having a head 27. The spring 28 is compressed between the end of rod 24 and the pin head 27 and thrusts the pin head to the right. A pumping unit 29 extends upwardly from the lower portion of reservoir 10 and comprises diverging arms, one of which forms a pump cylinder 30 fitted with a pump plunger or piston 31 and the other of which arms extends upwardly and into the opening in member 23, filling the latter and providing a bearing for rod 24. A discharge passage 32 extends through the latter mentioned arm into the interior of member 23.

An upstanding boss 33 on member 23 has an enlarged head 34 forming a cup which is supplied with lubricant through the vertical opening 35 connecting with the interior of member 23.

A bell crank 36 is pivoted at 37 to a wall 38 extending between the two arms of the pumping unit and the ends of bell crank 36 engage pin head 27 and the outer end of piston 31, respectively. A spring 39 seated between the upper end of cylinder 30 and the head on the end of piston 31 tends to thrust the piston and bell crank upwardly and thereby thrust the rod 24 to the left.

As will be readily understood by those skilled in the art, the journal and wheel hub will play back and forth relative to the box and every movement of the hub to the right will thrust piston 31 downwardly and every movement of the hub to the left will permit spring 39 to move piston 31 upwardly. Such movements will be accompanied by the inlet of lubricant from the reservoir through the inlet valve 40 and the subsequent discharge of lubricant through the check valve 41 to passage-way 32. Spring 28 will be heavy enough to move rod 24 as a unit with pin 26 under normal conditions but will permit these elements to telescope if there is any abnormal condition preventing the intended operation of the device. Such a condition may exist, for instance, if there should be water in the reservoir which would freeze and interfere with the movement of rod 24 or of piston 31.

In order to distribute the lubricant supplied to cup 34 over the entire lower surface of the journal, I provide a series of felt pads 42 stood on edge on a carrier plate 43 and contacting with the lower face of the journal. Preferably, but not necessarily, thin metal plates 44 extend along each side of each pad 42 and, preferably, a series of thin washers 45 are hung upon a wire 46 to space adjacent plates 44 slightly from each other. Springs 66 yieldingly support plate 43 thrusting pads 42 and plates 44 against the journal. The plates are of soft material and do not score the journal surface but are stiff enough to relieve the ends of pads 42 of excessive pressure as would cause glazing of the surface of pads 42 contacting with the journal which would likely occur if the pads themselves took all of the pressure from springs 76. The lower portions of the pads are always immersed in oil contained in the sub-cellar 16 but the level of the oil in the sub-cellar cannot rise above openings 47 but will flow through the latter to the bottom of the cellar and back to the reservoir. Spacing of plates 44, exaggerated in the drawings, provides for capillary feed of oil between the plates from the lower portion of the sub-cellar to the upper surfaces of pads 42 and independently of the capillary feed through the fibers of the pads.

Since the oil discharged from the pump is fed in substantial quantities to the middle portion of the journal, this part of the journal will tend to carry a surplus quantity of oil with it and the counterbore 5 is designed to collect such surplus oil and conduct it to the end of the bearing, where it will flow down through groove 7ᵃ and through hole 48 to the bottom of the cellar and from thence to the reservoir.

The bearing 3 is also provided with transverse or radial grooves 49 which tend to intercept the flow of oil lengthwise of the journal and direct it downwardly to the sides of the box. Preferably, the box sides are grooved to receive light metal strips 50 which extend into the cellar and, hence, any surplus oil which is carried around by the journal is finally returned to the cellar and reservoir.

Cooperating with the elements just described is the pad 51 machined on the inside of the wheel hub and the collar 52 applied to the journal at the opposite end of the box and the sheet metal retaining flange 53 applied to the box with a lip extending over the back of collar 52.

This collar and flange also gather any oil which squirts out of the end of the bearing opposite the hub and returns it to the cellar through the opening 72 and through the space between the end of the sub-cellar and the cover 15.

In order to provide for adjustment of the pumping operation, I arrange a by-pass 54 extending laterally from member 23, the same having an outlet hole 55 through which oil can flow to the cellar. A valve 56 in the by-pass is yieldingly held in front of opening 55 by a spring 57, the force of which may be adjusted by turning a plug 58. If plug 58 is turned to increase the pressure of spring 57 on valve 56, a larger quantity of oil will be pumped through the discharge outlet 35. If the pressure of spring 57 is reduced substantially, the pressure of oil in passage-way 35 will move valve 56 and permit a substantial portion of the oil to escape through hole 55. By means of this arrangement, the lubricator may be adjusted for light or heavy oil; for summer or winter operation; for abnormal or subnormal play of the journal in the box; for high or low running speeds; and for any other conditions which may vary the quantity of oil to be discharged against the journal.

The above described construction results in effective and easily adjusted pumping of the oil from the reservoir to the lower surface of the journal and to the distributing pads 42. Any surplus oil carried around by the journal is caught in recesses 5 and 49 or by collar 52 or the hub surface 51. Any lubricant reaching collar 52 or hub surface 51 is discharged by centrifugal force or gravity against the retaining ring 53 or the box and cellar grooves 7—7ª, respectively, and returned to the reservoir.

The pumping unit is easily removed from the cellar by detaching cover 15 and rotating the downwardly depending pumping unit to the position shown in broken lines in Figure 3 which will free the outer edge of wall 38 from the up-standing lip 59 on the reservoir and permit the pump to be moved longitudinally of the cellar. This arrangement requires a smaller cover than has been used previously and the pump locks the sub-cellar against removal even though the cover is lost.

In Figure 6 I illustrate a modification of the operating rod structure in which the right hand end of the rod 60 is solid and of reduced diameter and extends through the upper arm 61 of the pumping unit and has a bushing 62 frictionally mounted near its outer end and adapted to engage the adjacent finger 63 of the bell crank pivoted at 64. In the event of any positive obstruction to the movement of the rod or of the piston 65, bushing 62 will slide on rod 60 and avoid breakage.

Figure 7 illustrates a modified structure which may be used to advantage particularly where there is insufficient metal on the wheel hub to permit of the machining necessary to form the throw-off ring. Under such conditions, the desired result can be had by welding onto the face of the wheel hub 66 an additional metal piece 67 which may be formed of sheet metal or otherwise and corresponds to the boss on the wheel hub and may project into a corresponding recess formed in the box 68. This member 67 corresponds somewhat to a hub liner applied to the wheel.

Various other details of the structure may be changed without departing from the spirit of my invention and I contemplate the exclusive use of such modifications as come within the scope of my claims.

I claim:

1. In combination, an axle journal, a lubricant reservoir, a pump for delivering a supply of lubricant from said reservoir to a point on the lower face of said journal, a bearing resting on said journal and having a recess in its journal engaging face opposite to said point, there being a passage-way leading from said recess through said bearing to the end of said bearing, and means for returning surplus lubricant from said passage-way to said reservoir.

2. In combination, an axle journal, a bearing resting thereon, a wheel mounted on the axle adjacent said journal and having a hub face opposing an end of said bearing, a lubricant reservoir, means for supplying lubricant from said reservoir to the opposed faces of said bearing and hub, and means for collecting surplus lubricant so supplied and returning it to said reservoir.

3. In a journal lubricator of the class described, a pumping unit comprising two upright legs one of which legs forms a cylinder and the other of which legs includes a discharge passage-way inlet, check valves at the bottom of said unit, a piston in said cylinder, a horizontally disposed actuating rod slidably mounted in the upper end of the other leg, and an operating connection between said rod and piston.

4. In a journal lubricator of the class described, a pumping unit comprising two upright legs, one of which legs forms a cylinder and the other of which legs includes a discharge passage-way inlet, check valves at the bottom of said unit, a piston in said cylinder, a horizontally disposed actuating rod slidably mounted in the upper end of the other leg, and a T-shaped element with its leg pivoted on said member and having one end of its arm engaging said piston and the other end of its arm engaging said rod.

5. In a lubricator of the class described, a cellar including a lubricant reservoir, a sub-cellar supported at a substantial distance above said reservoir and including a horizontal passage from end to end, an actuating rod slidable in said passage, a telescoping extension on one end of said rod, a pump unit in said reservoir, and an operative connection between said extension and said unit.

6. In a lubricator of the class described, a cellar including a lubricant reservoir, a sub-cellar supported at a substantial distance above said reservoir and including a horizontal passage from end to end, a pump unit including a cylinder and piston and a discharge barrel extending upwardly from said reservoir with a horizontal extension fitting into said passage, an actuating rod mounted to reciprocate in said passage and extension, and an operative connection between said rod and said piston.

7. In a lubricator of the class described, a cellar having a bottom wall and open at one end above the level of said wall, a lubricant reservoir at said end of said cellar and extending downwardly below the level of said wall, a sub-cellar located above said bottom wall and having a horizontal passage, a pumping unit extending upwardly from the lower portion of said reservoir and including a horizontal discharge arm extending into said passage, said unit being rotatable about said arm as an axis to raise the unit above the level of said wall and permit its removal through said end, and a removable closure for the top of said reservoir and the adjacent open end of said cellar.

8. In a lubricator of the class described, a lubricant reservoir, a pump, a delivery passage-way leading from said reservoir to the journal to be lubricated, a by-pass leading from said passage-way to said reservoir, a closure for said by-pass movable to open position by pressure of fluid in said passage-way, and means for varying the degree of pressure required to move said closure.

9. In a lubricator of the class described, a lubricant reservoir, a pump, a delivery passage-way leading from said reservoir to the journal to be lubricated, a by-pass member leading laterally from said passage-way and having an outlet in the side of said member, a plunger slidable in said member to open or close said outlet, a spring thrusting said plunger to a position closing said outlet, and a plug threaded into the outer end of said member and forming an adjustable seat for said spring to vary the thrust thereof and thereby adjust the device for functioning to by-pass lubricant at different pressures.

10. In a lubricator, a cellar forming a lubricant reservoir, a sub-cellar including a lubricant containing pan, means for pumping lubricant from said reservoir to said pan, a plurality of pads of absorbent material with their lower portions in said pan and their upper edges adapted to contact with a journal to be lubricated, and means slightly spacing said pads from each other to provide capillary passage-ways between said pads.

11. In a lubricator, a cellar forming a lubricant reservoir, a sub-cellar including a lubricant containing pan, means for pumping lubricant from said reservoir to said pan, a plurality of pads of absorbent material with their lower portions in said pan and their upper edges adapted to contact with a journal to be lubricated, and pairs of rigid elements between each two adjacent pads and slightly spaced from each other to provide capillary passage-ways between said pads.

12. In a lubricator, a cellar forming a lubricant reservoir, a sub-cellar including a lubricant containing pan, elevated above the bottom of said reservoir, a mechanically operated pump for pumping lubricant from said reservoir to said pan, a plurality of relatively thin felt pads arranged in the form of upright slabs extending transversely of the axis of a journal to which the lubricator is to be applied with their lower edges in said pan and their upper edges adapted to contact with said journal, and form-sustaining elements between said pads forming lateral supports therefor to hold the upper edges of said pads in journal contacting position.

13. In a lubricator, a cellar forming a lubricant reservoir, a sub-cellar including a lubricant containing pan, elevated above the bottom of said reservoir, a mechanically operated pump for pumping lubricant from said reservoir to said pan, a plurality of relatively thin felt pads arranged in the form of upright slabs extending transversely of the axis of a journal to which the lubricator is to be applied with their lower edges in said pan and their upper edges adapted to contact with said journal, and light gauge sheets of metal comparatively softer than said journal located between said elements and adapted to bear against said journal and to be worn down by the same, said sheets forming lateral supports for said pads to hold the upper edges of said pads in journal contacting position.

14. In combination, a locomotive driving box having top and side walls and an open bottom, a bearing seated against said walls, a detachable cellar extending between the lower portions of said side walls and forming a lubricant reservoir, means for pumping lubricant from said reservoir to the journal on which the device is mounted, said box and cellar cooperating to provide a continuous groove surrounding said journal adjacent to the end of the box to return oil discharged from the end of said bearing to said cellar the inner end of said bearing forming a portion of the side of said groove.

15. In combination, an axle journal, a wheel mounted thereon and including a hub having a boss about the journal, a bearing on said journal spaced from said boss, a journal box and cellar cooperating to form a continuous end wall surrounding said journal adjacent said boss and provided with a recess for receiving said boss, a lubricant reservoir in said cellar, means for pumping oil from said reservoir to said journal, the sides of said recess being undercut to provide a groove for receiving oil discharged from said boss.

16. In combination, an axle journal, a wheel mounted thereon and including a hub having a boss about the journal, a bearing on said journal spaced from said boss, a journal box and cellar cooperating to form a continuous end wall surrounding said journal adjacent said boss and provided with a recess for receiving said boss, a lubricant reservoir in said cellar, means for pumping oil from said reservoir to said journal, the sides of said recess being undercut to provide a groove for receiving oil discharged from said boss, and the periphery of said boss being undercut to facilitate the discharge from the face of the boss of any oil which may pass along said journal beyond the end of said bearing to said hub.

17. In combination, an axle journal, a wheel mounted thereon and including a hub having a boss about the journal, a bearing on said journal spaced from said boss, a journal box and cellar cooperating to form a continuous end wall surrounding said journal adjacent said boss and provided with a recess for receiving said boss, a lubricant reservoir in said cellar, means for pumping oil from said reservoir to said journal, the sides of said recess being undercut to provide a groove for receiving oil discharged from said boss, there being a passage-way from the lower part of said groove to the interior of said reservoir.

18. In combination, an axle journal, a wheel mounted thereon and including a hub having a boss about the journal, a bearing on said journal spaced from said boss, a journal box and cellar cooperating to form a continuous end wall surrounding said journal adjacent to said boss, a lubricant reservoir in said cellar, means for pumping oil from said reservoir to said journal, and means for collecting surplus lubricant discharged from the adjacent faces of said bearing and boss and returning it to said reservoir.

19. In a device of the class described, a box having top and side walls, a bearing seated in said walls, a detachable cellar extending between the lower portions of said side walls and forming a lubricant reservoir, means for pumping lubricant from said reservoir to the journal on which the device is mounted, and elements on the side walls of said box for directing surplus lubricant gathering thereon over the side walls of said cellar where it may be returned to said reservoir.

20. In a device of the class described, a box having top and side walls, a bearing seated in said walls, a detachable cellar extending between the lower portions of said side walls and forming a lubricant reservoir, means for pumping lubricant from said reservoir to the journal on which the device is mounted, there being downwardly and inwardly inclined grooves in the side walls of said box and inclined sheets with their upper edges inserted in said grooves and with their lower portions extending over the side walls of said cellar to drain surplus lubricant accumulating on the walls of said box back into said reservoir.

21. In a journal lubricator of the class described, a pumping unit comprising two upright legs, one of which legs forms a cylinder and the other of which legs includes a discharge passage-way inlet, check valves at the bottom of said unit, a piston in said cylinder, and means for actuating said piston to pump oil through said valves to said passage-way.

22. In a railway journal lubricator, a pan-like lubricant container, a plurality of slabs of felt stood on end in said container, with the upper end of each of said pads forming a cut edge shaped to abut substantially throughout its width and length with a journal to be lubricated.

23. In a railway journal lubricator, a pan-like lubricant container, a plurality of slabs of felt stood on end in said container and arranged transversely of the axis of a journal to be lubricated, with the upper ends of the pads having a smooth concave cut throughout the length of the pads to fit closely against the journal throughout the width of each pad.

24. A lubricator including elements specified in claim 36 and also having a passage for lubricant leading through the slabs of felt to the journal, and a device for feeding lubricant through said passage.

In testimony whereof I hereunto affix my signature this 14th day of October, 1929.

JAMES J. HENNESSY.